United States Patent [19]

Kamata

[11] Patent Number: 5,634,163
[45] Date of Patent: May 27, 1997

[54] LENS-FITTED PHOTO FILM UNIT

[75] Inventor: Kazuo Kamata, Kanagawa, Japan

[73] Assignee: Fuji Photo Film Co., Ltd., Kanagawa, Japan

[21] Appl. No.: 665,806

[22] Filed: Jun. 18, 1996

[30] Foreign Application Priority Data

Jun. 20, 1995 [JP] Japan ..................... 7-153013

[51] Int. Cl.$^6$ ............... G03B 7/08; G03B 9/02; G03B 9/00; G03B 9/08
[52] U.S. Cl. ............... 396/458; 396/460; 396/463; 396/506; 396/508
[58] Field of Search ............... 354/446, 270.4, 354/271.1, 228, 231, 234.1; 396/257, 458, 460, 463, 506, 508

[56] References Cited

U.S. PATENT DOCUMENTS

| | | | |
|---|---|---|---|
| 4,125,848 | 11/1978 | Ito et al. | 354/446 |
| 4,515,457 | 5/1985 | Harvey | 354/228 |
| 4,564,278 | 1/1986 | Ohmura | 354/234.1 |
| 4,681,417 | 7/1987 | Fujino et al. | 354/234.1 |
| 4,758,859 | 7/1988 | Uematsu et al. | 354/448 |
| 5,296,885 | 3/1994 | Sangregory et al. | 354/270 |
| 5,317,362 | 5/1994 | Takahashi | 354/484 |
| 5,337,110 | 8/1994 | Dowe | 354/271.1 |

*Primary Examiner*—Safet Metjahic
*Assistant Examiner*—Michael Dalakis
*Attorney, Agent, or Firm*—Young & Thompson

[57] ABSTRACT

A lens-fitted photo film unit is pre-loaded with photo film (31). An exposure is taken through an exposure opening (43) upon depression of a shutter button (14) to a full depressed position. A halfway position of the shutter button is less deep than the full depressed position. A power source switch (44) is switched on upon movement of the shutter button to the halfway position. A photometric circuit (50, 60) receives light of an object, and for generating a changeover signal when brightness of the object is a predetermined brightness or more. The photometric circuit is rendered effective when the power switch is switched on. A changeover plate (46a) has a stop-down opening (46b) which is formed therein, and has a size smaller than the exposure opening. The changeover plate is movable between an inserted position and a retracted position. The stop-down opening of the inserted position is superposed on the exposure opening to intercept a periphery of the exposure opening. The stop-down opening of the retracted position is away from the exposure opening. The changeover plate is set in the inserted position upon occurrence of the changeover signal and in response to movement of the shutter button to the full depressed position from the halfway position. The changeover plate is set in the retracted position in absence of the changeover signal.

12 Claims, 10 Drawing Sheets

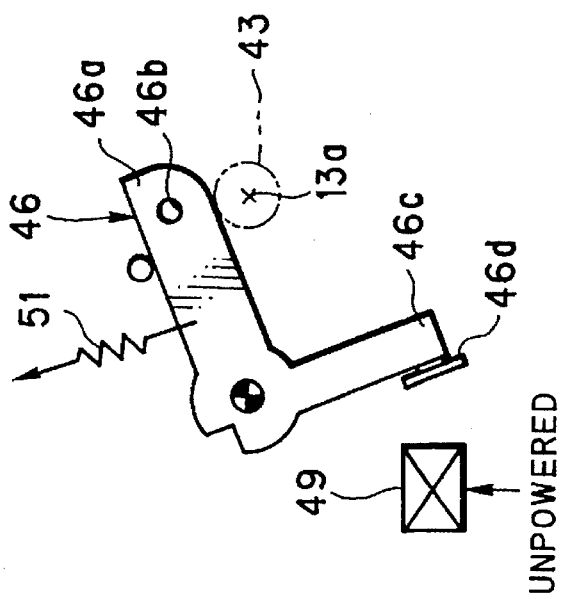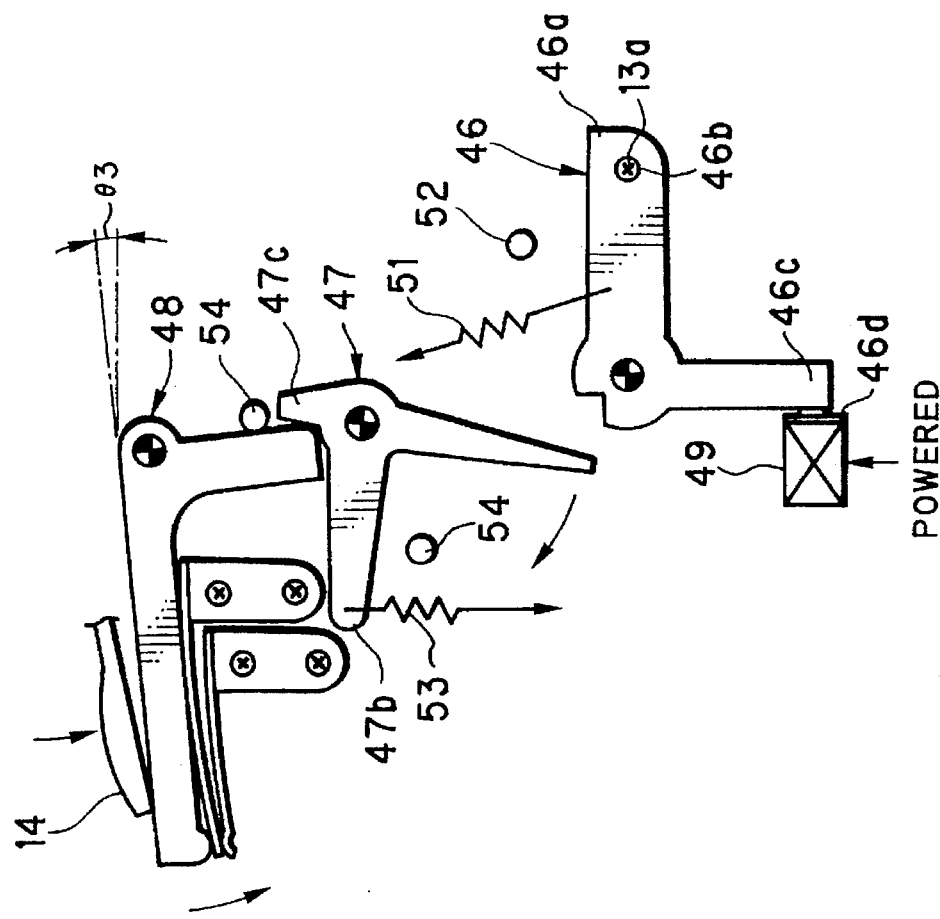

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit having a simple mechanism for changing over exposure.

2. Description Related to the Prior Art

There is a lens-fitted photo film unit which is pre-loaded with photo film as a single-use camera sold at a low cost, and with which a photograph can be taken with high image quality without further difficulty than depression of a shutter. The lens-fitted photo film unit has a fixed aperture. This possibility of the high image quality is based firstly on high speed of the photo film as pre-loaded, and secondly on fine adjustment of exposure in printing operation in a photo laboratory. In producing a photographic print from the photo film, an exposure amount for exposing photographic paper can be sufficiently corrected by compensation in the printing, even if the exposure amount has not been optimum initially.

The high speed photo film can be advantageously used, because a shutter speed can be raised and an aperture stop can be rendered small. The high shutter speed is effective in reducing the influence of a camera shake which would be caused incidentally by manual operation. The small aperture stop is effective in refining pan-focus performance.

In use of the high speed photo film, it is likely to photograph over-exposed frames, typically outdoors under sun-light even within the range of the latitude of the photo film. It is necessary to print an over-exposed frame for a long exposure time for the purpose of optimizing exposure of photographic paper.

A user of the lens-fitted photo film unit deposits it to a photofinisher, which is expected to effect operation of developing the photo film and printing photographs quickly. However the printing operation requires longer time if there are a greater number of over-exposed frames. This is inconsistent with efficiency.

SUMMARY OF THE INVENTION

In view of the foregoing problems, an object of the present invention is to provide a lens-fitted photo film unit in which the number of over-exposed frames can be reduced.

In order to achieve the above and other objects and advantages of this invention, a power source switch is connected to a power source, and switched on upon movement of the shutter button to the halfway position. A photometric circuit receives light of an object, and for generating a changeover signal when brightness of the object is a predetermined brightness or more, the photometric circuit being rendered effective when the power switch is switched on. A changeover plate has a stop-down opening which is formed therein, and has a size smaller than the exposure opening, the changeover plate being movable between an inserted position and a retracted position, the stop-down opening of the inserted position being superposed on the exposure opening to intercept a periphery of the exposure opening, and the stop-down opening of the retracted position being away from the exposure opening. A stop drive unit moves the changeover plate, the stop drive unit setting the changeover plate in the inserted position upon occurrence of the changeover signal and in response to movement of the shutter button to the full depressed position from the halfway position. The stop drive unit sets the changeover plate in the retracted position in absence of the changeover signal.

BRIEF DESCRIPTION OF THE DRAWINGS

The above objects and advantages of the present invention will become more apparent from the following detailed description when read in connection with the accompanying drawings, in which:

FIG. 8A is an explanatory view illustrating the exposure changeover mechanism upon the full depression of the shutter release button;

FIG. 8B is an explanatory view similar to FIG. 8A, but in which an electromagnet is not driven;

DETAILED DESCRIPTION OF THE PREFERRED EMBODIMENT(S) OF THE PRESENT INVENTION

Figure 1:
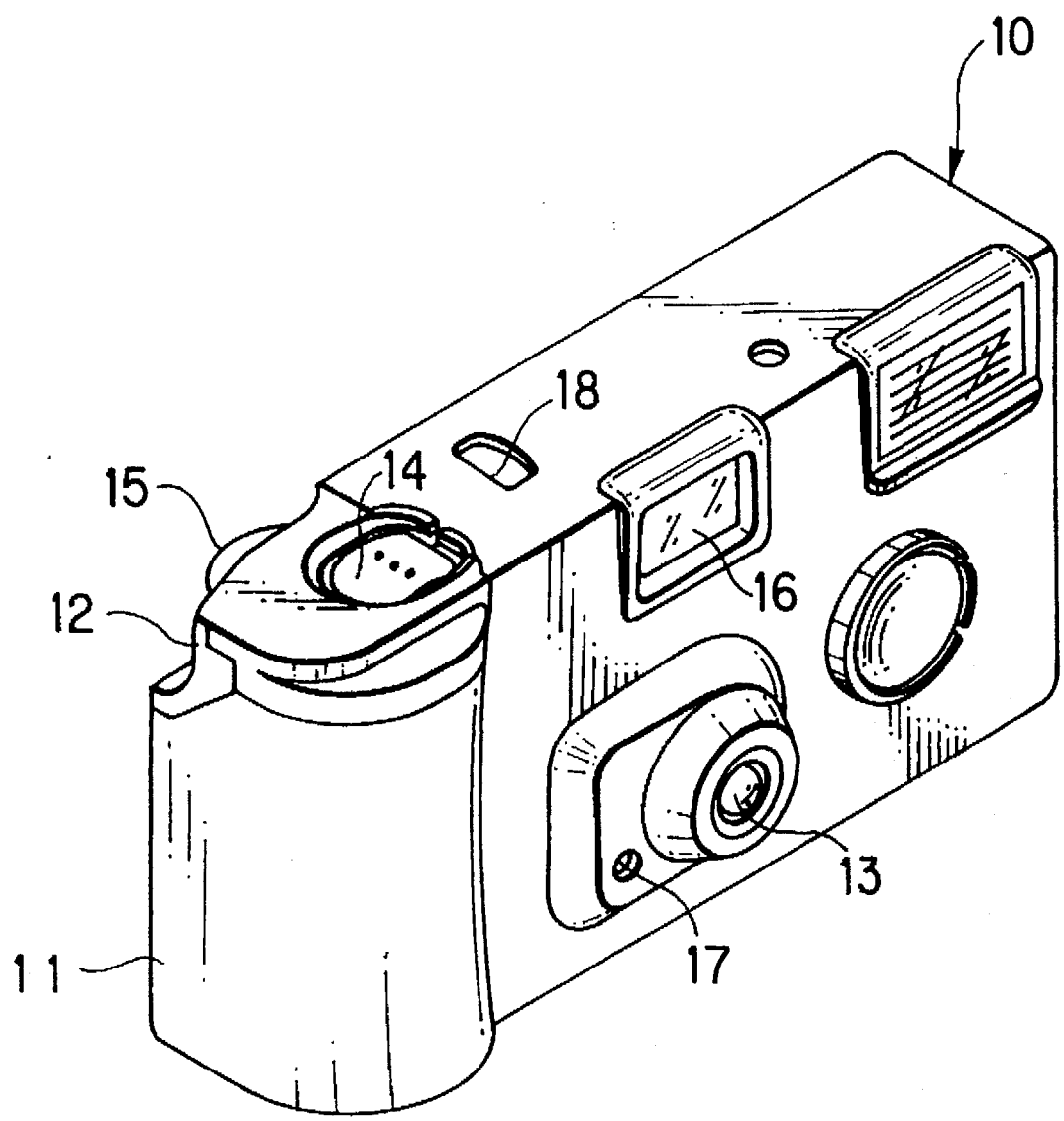
FIG. 1 is a perspective illustrating a lens-fitted photo film unit.

In FIG. 1, a lens-fitted photo film unit 10 includes a cardboard wrapper 11 and a housing 12. There are formed openings in the cardboard wrapper 11 for emergence of a taking lens 13, a shutter release button 14, a winding wheel 15, a viewfinder 16, a photometric window 17, and a frame counter 18. The shutter button 14 is depressed halfway to effect photometry, where brightness of an object to be photographed is measured. Exposure is determined in selection from two values automatically according to the measured brightness.

Figure 2:
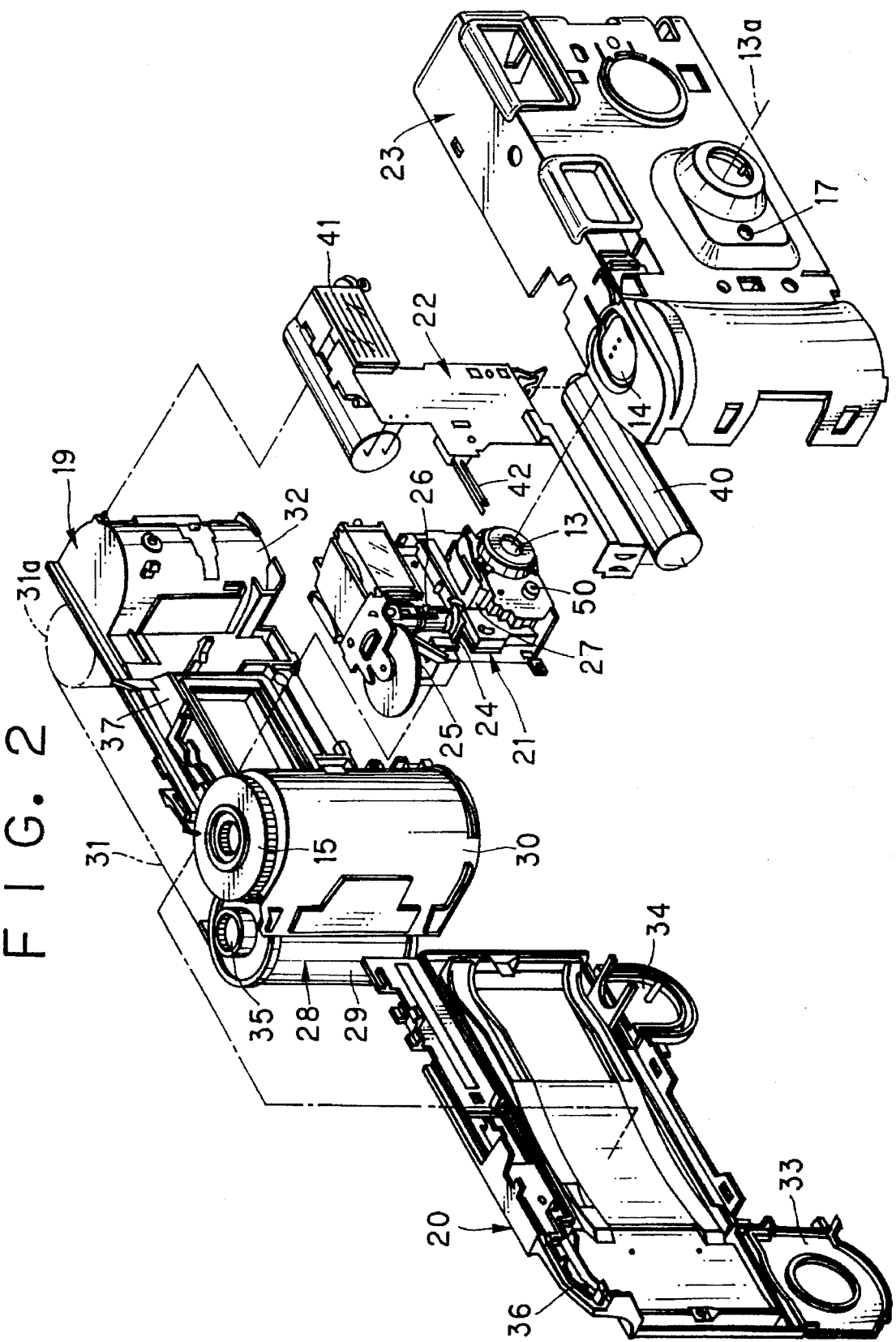
FIG. 2 is an exploded perspective illustrating a housing of the lens-fitted photo film unit.

The housing 12, as illustrated in FIG. 2, includes a photo film containing unit 19 as a body, a rear cover 20, an exposure-taking unit 21, a flash device 22 and a front cover 23. The exposure-taking unit 21 is mounted in front of the photo film containing unit 19 in removable fashion. The exposure-taking unit 21 has the taking lens 13, a shutter mechanism 24, a one-frame advance mechanism 25 for photo film 28, a shutter charge mechanism 26 and an exposure changeover mechanism 27. With those elements, the exposure-taking unit 21 is unified. The rear cover 20 is mounted on the rear of the photo film containing unit 19 in removable fashion, to contain the photo film 28 with the cassette in light-tight fashion between it and the photo film containing unit 19.

The front cover 23 is mounted on the front of the photo film containing unit 19 in removable fashion, and squeezes the exposure-taking unit 21 between it and the photo film containing unit 19. The top wall of the front cover 23 has the shutter button 14, which is connected to one side of a quadrilateral opening in the front cover 23 and formed as a portion of the front cover 23. When the shutter button 14 is depressed by manual operation, the shutter mechanism 24 in the exposure-taking unit 21 is actuated.

The photo film containing unit 19 has a cassette containing chamber 30 and a roll chamber 32. The cassette containing chamber 30 contains a cassette 29. The roll chamber 32 contains a roll 31a of unexposed photo film 31 drawn out of the cassette 29. The photo film 31 has speed of for example ISO 800 or more. Note that it is possible to use a spool about which the roll 31a is formed, and which is contained together with the roll 31a in the roll chamber 32.

There are bottom openings through which the cassette containing chamber 30 and the roll chamber 32 are open. After loading of the photo film 28, bottom lids 33 and 34 formed on the rear cover 20 are fitted to close the bottom openings. The bottom lid 33 is openable to remove the cassette 29 in an axial direction of a spool 35 of the cassette 29.

The winding wheel 15 is disposed on the top wall of the cassette containing chamber 30 in rotatable fashion, and engaged with the spool 35 of the cassette 29. A portion of the winding wheel 15 emerges through a slot 36 in the rear cover 20, and manually moved in rotational fashion counterclockwise to wind the photo film. The spool 35 is rotated in the winding direction, to wind an exposed portion of the photo film 31 into the cassette 29.

There is an exposure tunnel 37 formed between the cassette containing chamber 30 and the roll chamber 32. The rear of the exposure tunnel 37 has an exposure aperture, of which a face is curved about an optical axis 13a of the taking lens 13 for compensation of an image surface of the taking lens 13. The front of the exposure tunnel 37 has an opening, through which object light passed in the exposure-taking unit 21 is introduced to the exposure aperture.

The flash device 22 includes a flash emanator 41 and a printed circuit board, on which an X contact 42 is fixedly mounted. There is a battery 40 as a power source contained in the flash device 22 to supply it with power.

Figure 3:
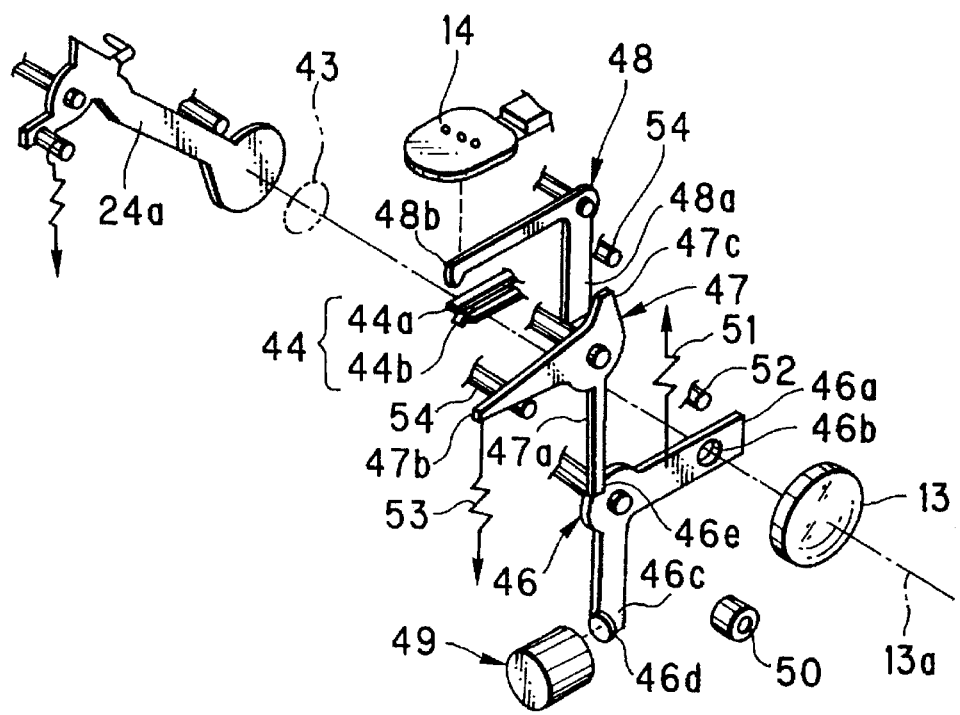
FIG. 3 is an exploded perspective illustrating an exposure changeover mechanism.

As illustrated in FIG. 3, the shutter mechanism 24 has a shutter blade 24a, which is stricken when the shutter button 14 is fully depressed, and makes a back-and-forth swing for one time behind an exposure opening 43, which is formed to lie on the optical axis 13a of the taking lens 13 in stationary fashion. The exposure changeover mechanism 27 includes a photoelectric switch device, a changeover plate 46a, and a stop drive unit. The photoelectric switch device includes a photometric circuit.

The changeover plate 46a has a stop-down opening 46b smaller than the exposure opening 43. The changeover plate 46a is a portion of a changeover lever 46, which is rotatable on a plane perpendicular to the optical axis 13a. The changeover plate 46a is rotated between inserted and retracted positions. In the inserted position, the stop-down opening 46b is placed in front of the exposure opening 43. In the retracted position, the changeover plate 46a is located away from the exposure opening 43. The photoelectric switch device consists of a circuit including CdS (cadmium sulfide) element 50 (See FIG. 4) in cooperation with a power switch 44 for detecting the halfway depression of the shutter button 14. When the object brightness is detected to be at or above a predetermined brightness, the photoelectric switch device generates a changeover signal.

To change over the aperture stop, when the changeover signal is output, the changeover plate 46a is retained in the inserted position when the shutter button 14 is depressed to the full depressed position down from the halfway position. When no changeover signal is output, the changeover plate 46a is retained in the retracted position. This is operated by combination of a retainer lever 47, an intermediate lever 48, an electromagnet 49 and springs 51 and 53.

The changeover lever 46 has a bottom arm 46c formed therewith. There is a metal segment or armature 46d secured to an end of the bottom arm 46c. In a rotational orbit of the armature 46d, the electromagnet 49 is located in a position of contact on the armature 46d of the changeover lever 46 having the inserted position. The changeover lever 46 is constantly biased by the spring 51 toward the retracted position. The electromagnet 49 magnetically attracts the armature 46d, and retains the changeover lever 46 in the inserted position. Reference numeral 52 designates a stopper for stopping the changeover lever 46 in the retracted position.

The retainer lever 47 has a bottom arm 47a. The retainer lever 47 is rotatable between retaining and releasing positions. In the retaining position, the bottom arm 47a is engaged with a recess 46e in the changeover lever 46. In the releasing position, the bottom arm 47a is retracted from the recess 46e to release the changeover lever 46 from the retention in the inserted position. The spring 53 is connected on another distal end 47b of the retainer lever 47, and biases the retainer lever 47 constantly toward the retaining position. The spring 53 retains the changeover lever 46 in the inserted position via the retainer lever 47, so that the spring 53 is stronger than the spring 51. Reference numeral 54 designates a stopper for stopping the retainer lever 47 in the retaining position.

The retainer lever 47 includes a top projection 47c for engagement with a bottom arm 48a of the intermediate lever 48. The bottom arm 48a and the top projection 47c have relative positions such that there is a play between them in an initial step, and that the retention of the changeover lever 46 in the inserted position is released at a lapse of a predetermined duration after the power switch 44 is switched on. The intermediate lever 48 has a lateral arm 48b, which is located between the shutter button 14 and the power switch 44, and rotated by a bottom of the shutter button 14 when depressed.

When the intermediate lever 48 rotates in response to the halfway depression to the shutter button 14, the lateral arm 48b switches on the power switch 44. The bottom arm 48a is contacted on the top projection 47c of the retainer lever 47. The intermediate lever 48 further rotates, so that the bottom arm 48a rotates the retainer lever 47 toward the released position. The power switch 44 includes two segments 44a and 44b, which are contacted on each other and switched on.

Figure 4:
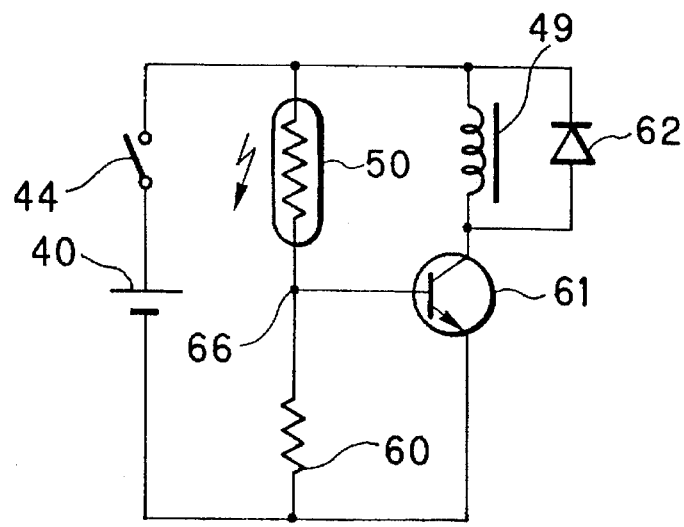
FIG. 4 is a schematic diagram illustrating circuitry for the exposure changeover mechanism.

As illustrated in FIG. 4, the photometric circuit is connected to the battery 40 used for a power source of the flash device 22, and includes the CdS element 50 and an invariable resistor 60 which are connected in series, and divides voltage of the battery 40. When a potential between the CdS element 50 and the resistor 60 comes up to a predetermined level or more, the changeover signal is generated. A base of a transistor 61 is connected to a connecting point 66 between the CdS element 50 and the resistor 60. In response to the changeover signal, the transistor 61 is switched on to drive the electromagnet 49. The CdS element 50 is disposed in the photometric window 17 for measuring object brightness, and resistance decreasing in accordance with increase in the object brightness. Examples of the photoconductive cell are not only CdS but a photodiode and the like.

The power switch 44 is closed by the halfway depression of the shutter button 14. The voltage of the battery 40 is divided by the combination of the CdS element 50 and the resistor 60, so that the potential of the connecting point 66 is increased according to decrease in the resistance of the CdS element 50. The resistance R of the resistor 60 is determined so that, if the object light incident on the CdS element 50 has brightness BV equal to or higher than the predetermined brightness, the potential of the connecting point 66 comes to the level switching on the transistor 61. When the object brightness is lower than the predetermined brightness, the transistor 61 remains switched off, not to drive the electromagnet 49. Note that there is a diode 62 connected in parallel with the electromagnet 49, for the purpose of preventing the transistor 61 from being destroyed by the back electromotive force created instantaneously at the start of driving the electromagnet 49.

Operation of the above construction is now described. The exposure changeover mechanism 27 has an initial position of FIG. 5. The upper segment 44a of the power switch 44 has force to recover its original shape. The lateral arm 48b of the intermediate lever 48 is contacted on the bottom of the shutter button 14 under this recovering force, to press the shutter button 14 upwards. The bottom arm 47a of the retainer lever 47 presses a side of the recess 46e under the bias of the spring 53, to retain the changeover lever 46 in the inserted position. The armature 46d of the changeover lever 46 is contacted on the electromagnet 49. There is a gap between the bottom arm 48a and the top projection 47c.

The winding wheel 15 is rotated in the winding direction, to wind the photo film 31. When the photo film 31 is moved as much as the length of one frame, the one-frame advance mechanism 25 is operated to disable the photo film 31 from being wound. In the meantime the shutter mechanism 24 is charged.

Figure 6:
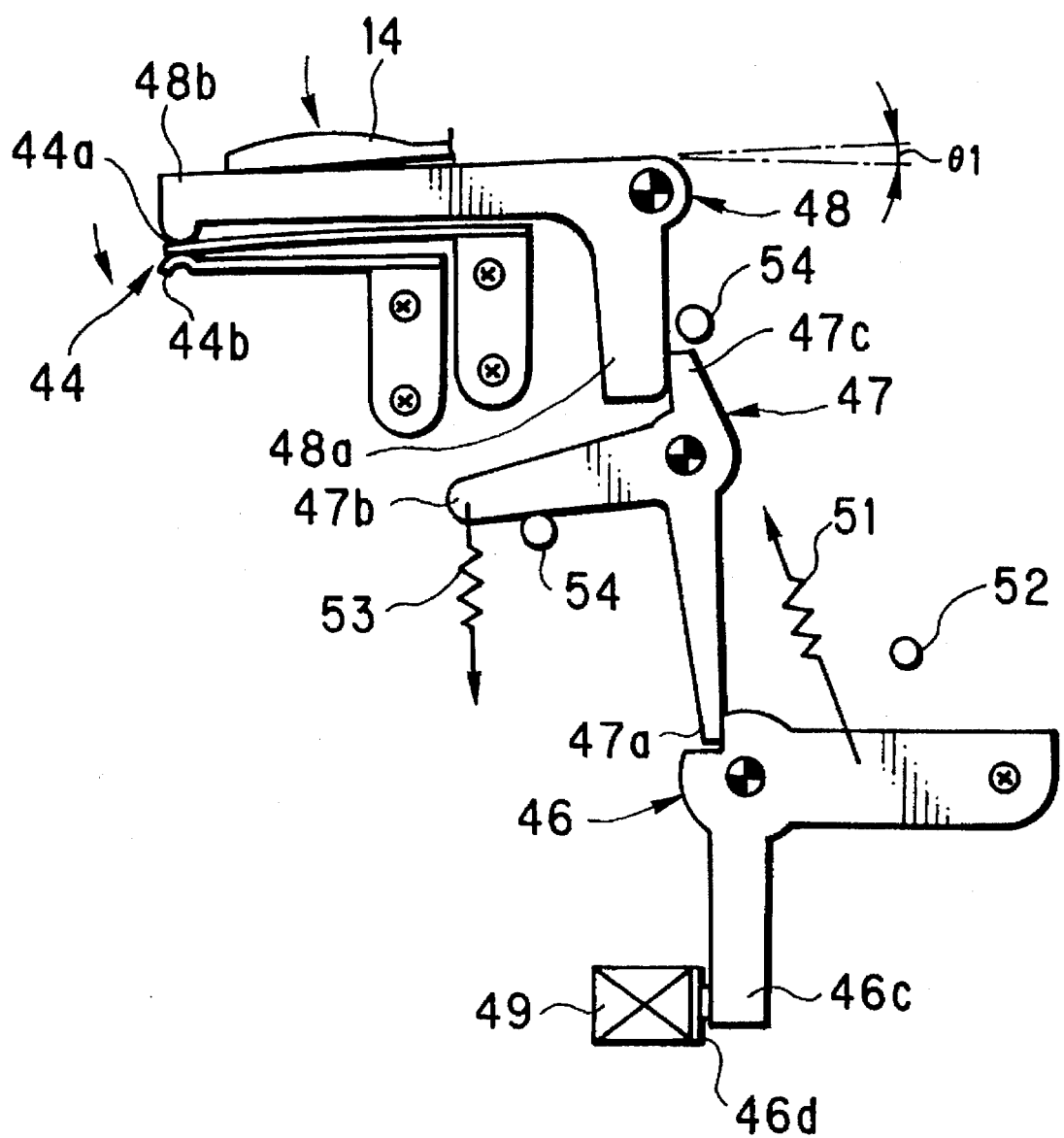
FIG. 6 is an explanatory view illustrating the exposure changeover mechanism upon halfway depression of a shutter release button.

The shutter button 14 is depressed. The intermediate lever 48 is rotated in accordance with a rotated amount of the shutter button 14 in the counterclockwise direction. As illustrated in FIG. 6, the halfway position of the shutter button 14 is determined at an angle θ1 as viewed relative to an initial orientation of the intermediate lever 48. The intermediate lever 48 having this position, the lateral arm 48b presses the upper segment 44a against the lower segment 44b. The power switch 44 is closed by contact between the segments 44a and 44b.

The retainer lever 47 is rotated only within the range of the gap between the bottom arm 48a and the top projection 47c, and not rotated further.

When the power switch 44 is closed, the CdS element 50 is supplied with electric power by the battery 40. The resistance of the CdS element 50 comes down to a value in accordance with intensity of the object light incident through the photometric window 17. The potential of the connecting point 66 between the CdS element 50 and the resistor 60 depends on the resistance of the CdS element 50 supplied with the power. Only when the object brightness is as much as the predetermined brightness or more, the transistor 61 is switched on to energize the electromagnet 49.

When the intermediate lever 48 has rotated as much as the angle θ1, the bottom arm 48a is contacted on the top projection 47c. Then the shutter button 14 is further depressed than the halfway position. The intermediate lever 48 rotates counterclockwise, to rotate the retainer lever 47 toward the released position against the spring 53.

Figure 7:
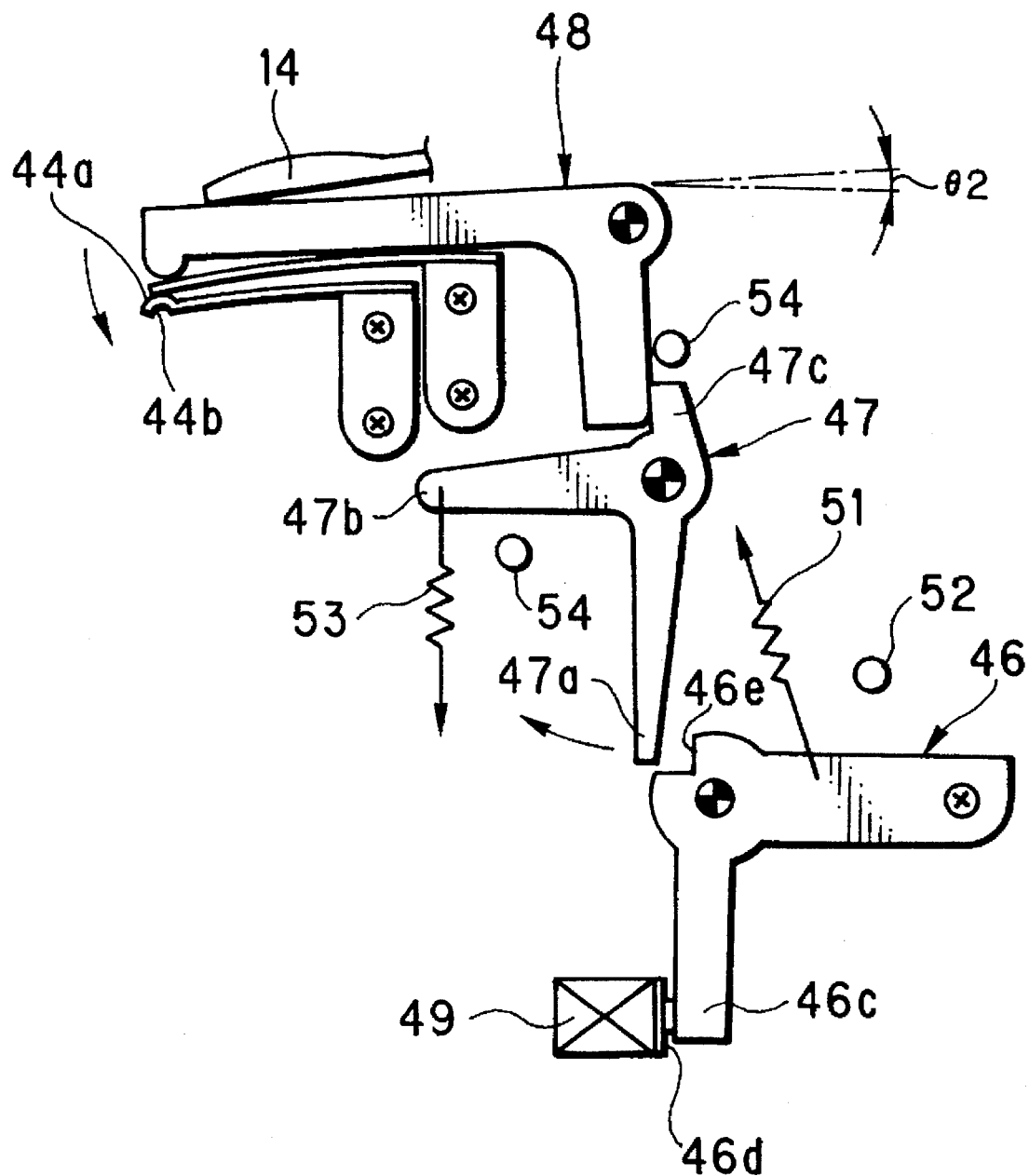
FIG. 7 is an explanatory view illustrating the exposure changeover mechanism after the halfway depression and before full depression of the shutter release button.

As illustrated in FIG. 7, the shutter button 14 stands by for the full depression when the intermediate lever 48 has the position of the angle θ2. The bottom arm 47a is retracted from a rotational orbit of the recess 46e. When the electromagnet 49 is driven as illustrated in FIG. 8A, the changeover lever 46 is retained in the inserted position against the bias of the spring 51. If the electromagnet 49 is not driven, the changeover lever 46 rotates to the retracted position by the bias of the spring 51, as illustrated in FIG. 8B.

When the shutter button 14 is depressed as deeply as the full depressed position, the intermediate lever 48 has rotated as much as an angle θ3 as viewed relative to its initial orientation. The shutter blade 24a is stricken to effect an exposure. The rotational position of the changeover lever 46 has been determined. If the object brightness is equal to or higher than the predetermined level, the exposure is effected with the light through the stop-down opening 46b and the exposure opening 43. If the object brightness is lower than the predetermined level, the exposure is effected through the exposure opening 43 without using the stop-down opening 46b.

Figure 5:
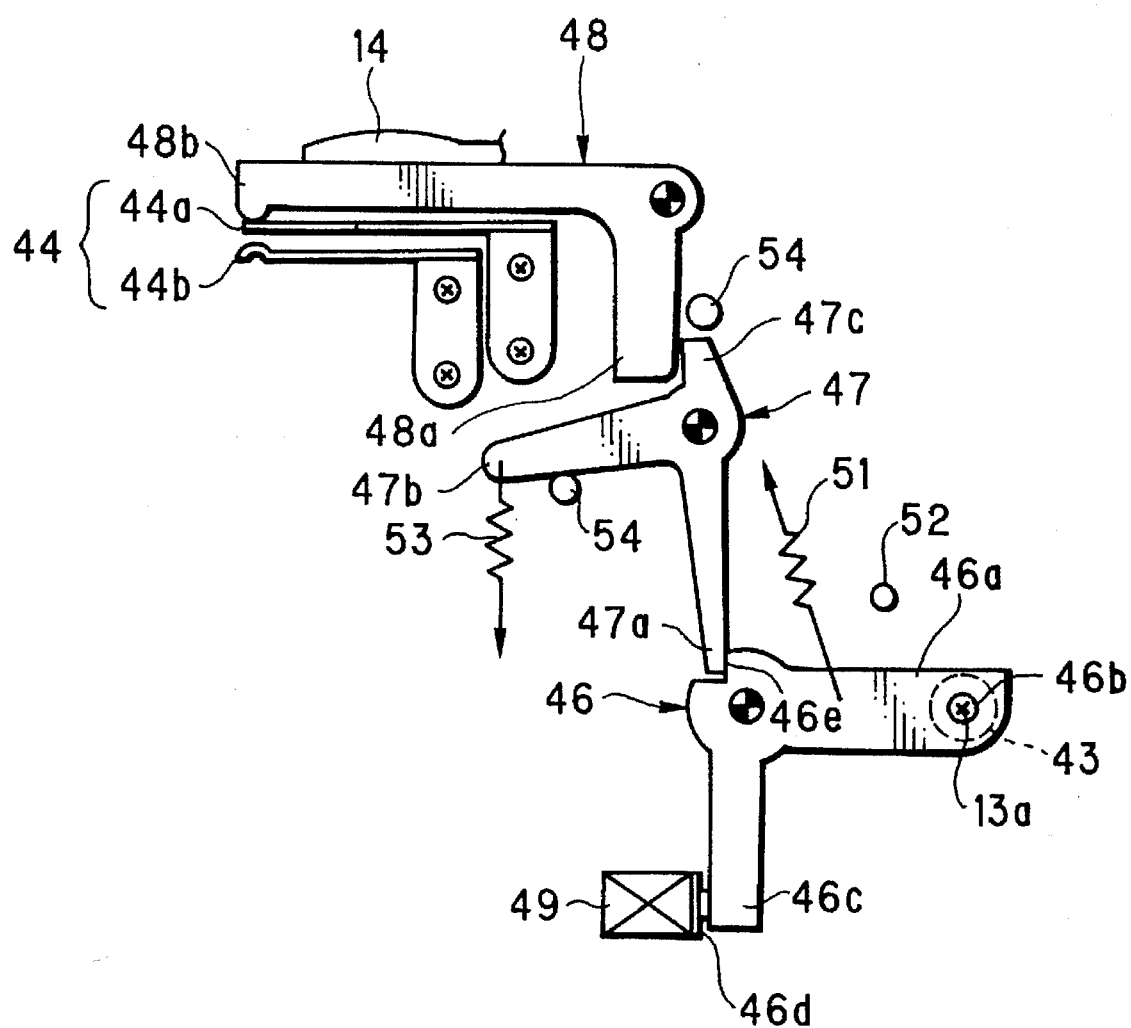
FIG. 5 is an explanatory view illustrating an initial state of the exposure changeover mechanism.

When the shutter button 14 finishes being depressed, the exposure changeover mechanism 27 is returned to the initial position depicted in FIG. 5. If a night scene or dark scene is to be photographed, the flash device is used. In the flash photography, the object brightness is lower than the predetermined brightness. The changeover plate 46a is in the retracted position, and the exposure opening 43 is used for taking an exposure. If the battery 40 is used up, the transistor 61 is not switched on any longer. Again the changeover plate 46a has the retracted position. The exposure opening 43 is used as the aperture. Should the battery 40 be disconnected or inactivated incidentally, exposures can be taken without any problem, only with over-exposed tendency. It is possible to produce photographic prints by use of the widely available printing system.

Similar operation is repeated, to take exposures in selection of one of the two stops in the fashion of automatic exposure control. When frames are exposed to use all the photo film 31, the photo film 31 is entirely wound into the cassette 29. The lens-fitted photo film unit 10 is deposited to a photo laboratory, where the bottom lid 33 is opened to remove the cassette 29.

The photo film 31 drawn out of the cassette 29 is developed by a photo film processor, and subjected to the printing operation in a photographic printer. In the printer, each of the frames is illuminated by light which is emanated from a light source and diffused by a diffusing plate. An image of the frame is focussed by a printing lens on photographic paper. A shutter is disposed across a path of the printing light, and controlled by a controller for opening/closing operation to optimize the exposure on the photographic paper. An over-exposed frame in general requires a longer exposure of the photographic paper in operation of the printer shutter, for printing at suitable exposure of the frame which appears somewhat dark on the negative film. In the present invention, however, the lens-fitted photo film unit 10 has performance capable of exposing all frames on the photo film 31 without excessive over-exposure. It is unnecessary to lengthen the exposure time in the printer shutter. Total time for printing of one strip of the photo film is reduced, as the number of over-exposed frames is reduced considerably.

Figure 9:
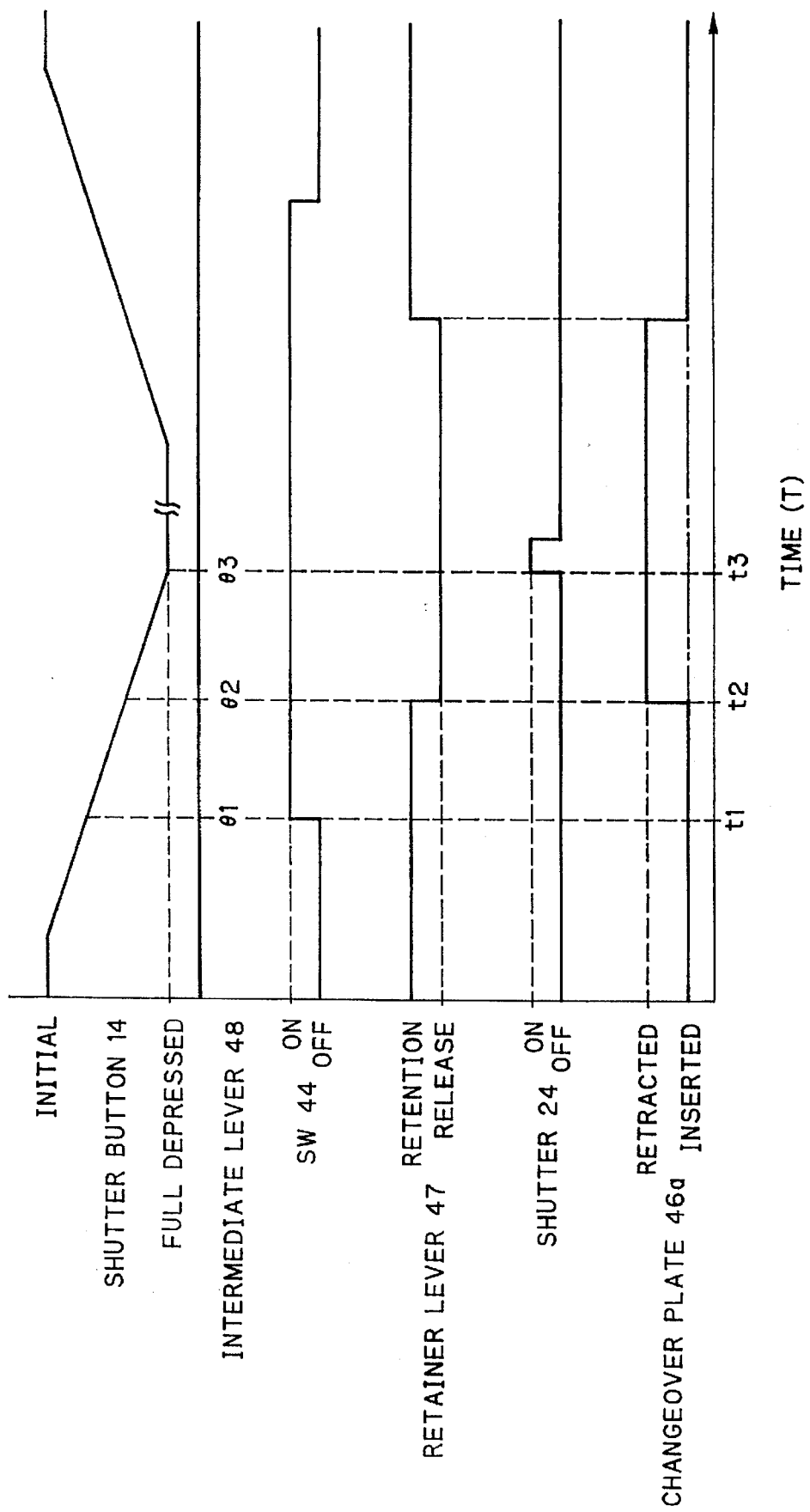
FIG. 9 is a timing chart illustrating operation of the exposure changeover mechanism relative to a depressed amount of the shutter button.

FIG. 9 is a timing chart of operation of the exposure changeover mechanism 27. It is assumed in FIG. 9 that the shutter button 14 is moved down in depression at a constant speed. At the time t1 after the start of depressing the shutter button 14, the intermediate lever 48 has a position of the angle θ1, where the power switch 44 is closed. The retainer lever 47 has the retaining position. The stop-down opening 46b is located in the optical axis 13a of the taking lens 13. At the time t2, the intermediate lever 48 has a position of the angle θ2. The retainer lever 47 releases the changeover lever 46 of the retention in the inserted position. It has been already determined whether or not to drive the electromagnet 49. The shutter button 14 is depressed at the time t3, to actuate the shutter mechanism 24.

In the exposure changeover mechanism 27 in the present embodiment, the changeover lever 46 is retained in the inserted position from the start of photometry until decision of driving the electromagnet 49. The armature 46d of the changeover lever 46 is kept on the electromagnet 49 without separation before the decision of driving the electromagnet 49. It is thus possible to change over the aperture stop even when the electromagnet 49 in use is an extra small type weak in attraction.

The resistance R of the resistor 60 is determined so that the potential level of the connecting point 66 is sufficient for switching on the transistor 61 when the object light incident on the CdS element 50 has brightness BV equal to or more than the predetermined brightness level. It is assumed that the photo film 31 has the speed of ISO 800 (SV=8), the latitude from −2 to +4, the shutter of the lens-fitted photo film unit has the shutter speed of 1/125 second (TV=7), combination of the taking lens 13 and the exposure opening 43 has an f-number of f:8 (AV=6), and combination of the taking lens 13 and the stop-down opening 46b has an f-number of f:22 (AV=9). To predetermine the brightness level, it is preferred that the light value LV is in a range from 14 to 17.

Figure 10:
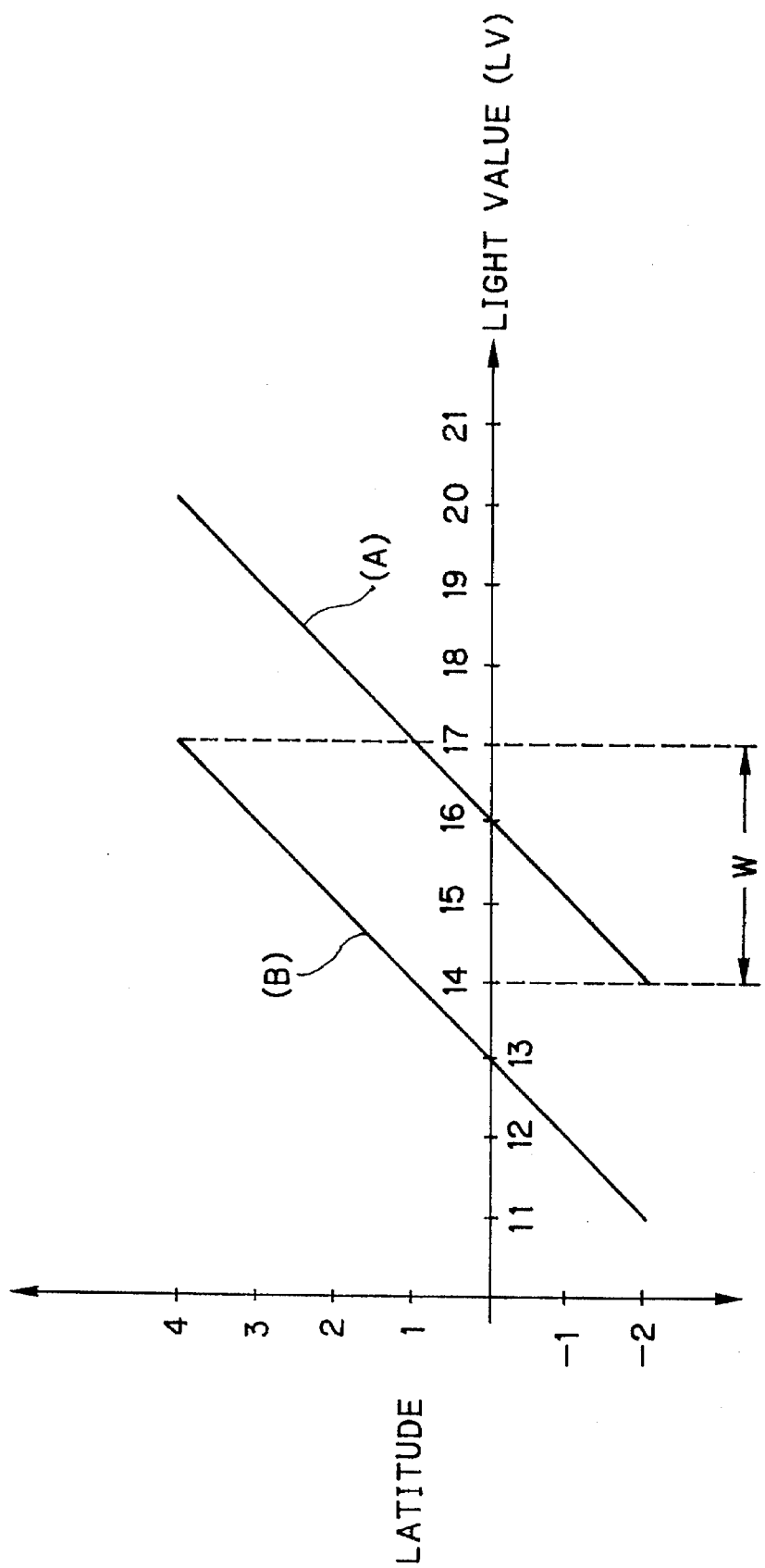
FIG. 10 is a graph illustrating a light value LV optimized to change over the exposure.

The exposure value EV is 16 (=7+9) when the stop-down opening 46b is located on the optical axis 13a, and 13 (=7+6) when the stop-down opening 46b is retracted from the optical axis 13a. Light value LV at which exposure is optimized with those of the exposure value EV is 16 and 13. With the latitude of the ISO-800 photo film 31 from −2 to +4, the light value LV is determined in consideration of appropriate exposure, to obtain a line (A) in a range from 14 to 20 in FIG. 10 when the stop-down opening 46b is located on the optical axis 13a, and a line (B) in a range from 11 to 17 when the stop-down opening 46b is retracted from the optical axis 13a. A range W where the lines (A) and (B) are overlapped is from 14 to 17. It is possible reliably to avoid over-exposure photography in sunlight.

Figure 11:
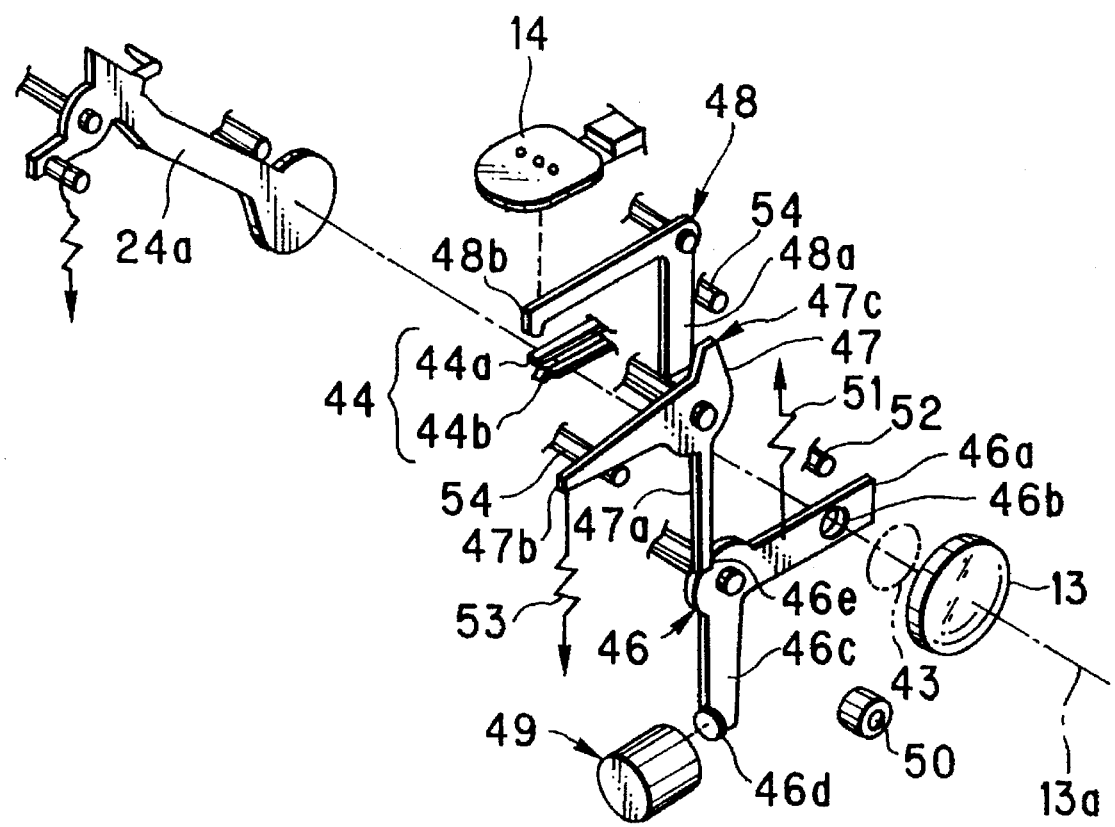
FIG. 11 is an exploded perspective illustrating another preferred exposure changeover mechanism.

In the above embodiment, the stop-down opening 46b is inserted to the front of the exposure opening 43. The present invention is also applicable to the stop-down opening 46b insertable to the rear of the exposure opening 43 as illustrated in FIG. 11. It is also possible to form two, greater and smaller, openings in a stop changeover plate, and to form an aperture close to the taking lens in a size not limited for the stopping.

In the above embodiment, the electromagnet is used for attraction of the armature. Alternatively a solenoid may be used as an electromagnetic moving device for pushing or pulling the changeover lever. With the solenoid, the armature may be eliminated.

In the above embodiment, the changeover plate 46a initially remains inserted, and becomes retracted for fully opening the stop. The present invention is applicable to construction with a changeover plate which initially remains retracted from the exposure opening, and becomes inserted in front of it for stopping down the stop. In this variant, when the shutter button is initially free, the changeover plate is kept in the retracted position by the retainer lever. The electromagnet attracts the armature of the changeover plate having the retracted position. The electromagnet is switched off upon occurrence of a changeover signal in the halfway depression of the shutter button. If the object brightness is high as compared with the predetermined limit brightness, the changeover plate is inserted while switching off the electromagnet. If the object brightness is low as compared with the limit brightness, the changeover plate is retracted by the electromagnet switched on.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit pre-loaded with photo film, wherein an exposure is taken through an exposure opening upon depression of a shutter button from an initial, unpressed position to a full depressed position, said lens-fitted photo film unit comprising:

there being a halfway position in depression of said shutter button, determined between said initial, unpressed position and said full depressed position;

a power source switch, connected to a power source, and switched on upon movement of said shutter button to said halfway position;

a photometric circuit for receiving light of an object, and for generating a changeover signal when brightness of said object is a predetermined brightness or more, said photometric circuit being rendered effective when said power switch is switched on;

a changeover plate having a stop-down opening which is formed therein, and has a size smaller than said exposure opening, said changeover plate being movable between an inserted position and a retracted position, said stop-down opening of said inserted position being superposed on said exposure opening to intercept a periphery of said exposure opening, and said stop-down opening of said retracted position being away from said exposure opening, said changeover plate being in said retracted position while said exposure is taken if said power source is exhausted; and a stop drive unit for moving only said changeover plate, said stop drive unit setting said changeover plate in said inserted position upon occurrence of said changeover signal and in response to movement of said shutter button to said full depressed position from said halfway position, said stop drive unit setting said changeover plate in said retracted position in absence of said changeover signal, said stop drive unit comprising:

a first spring for biasing said changeover plate toward said retracted position;

a retainer member, said retainer member movable as a result of depression of said shutter button, said retainer member holding said changeover plate in said inserted position when said shutter button is in said initial, unpressed position and when said shutter button is in said halfway position; said retainer member allowing said changeover plate to be moved by said first spring when said shutter button is in said full depressed position; and an electromagnet, said electromagnet being connected to said photometric circuit, said electromagnet contacting and holding only said changeover plate in said inserted position against said first spring in response to said changeover signal.

2. A lens-fitted photo film unit as defined in claim 1, wherein said stop drive unit moves said changeover plate from said inserted position to said retracted position upon movement of said shutter button to said halfway position or to said full depressed position and in absence of said changeover signal, said stop drive unit moves back said changeover plate from said retracted position to said inserted position when said shutter button is moved back from said full depressed position to said halfway position, and said stop drive unit retains said changeover plate in said inserted position upon occurrence of said changeover signal, irrespective of said full depressed position to which said shutter button is moved from said halfway position.

3. A lens-fitted photo film unit as defined in claim 1, wherein said stop drive unit moves said changeover plate from said retracted position to said inserted position upon movement of said shutter button to said halfway position or to said full depressed position and in absence of said changeover signal, said stop drive unit moves back said changeover plate from said inserted position to said retracted position when said shutter button is moved back from said full depressed position to said halfway position, and said stop drive unit retains said changeover plate in said retracted position upon occurrence of said changeover signal, irrespective of said full depressed position to which said shutter button is moved from said halfway position.

4. A lens-fitted photo film unit as defined in claim 1, wherein said photo film has speed of ISO 800, and an exposure value of taking said exposure is 3 EV smaller when said stop-down opening stops down said exposure opening than when said stop-down opening is away from said exposure opening.

5. A lens-fitted photo film unit as defined in claim 1, wherein said power source comprises a battery connected to an electronic flash device.

6. A lens-fitted photo film unit as defined in claim 5, wherein said photometric circuit comprises:

a resistor;

a photoconductive cell receiving said object light, said photoconductive cell having resistance decreasing when said object brightness increases, said photoconductive cell being connected in series between said resistor and through said power source switch to said battery; and a transistor, connected to said electromagnet, and having a base connected between said resistor and said photoconductive cell, and turned on by said changeover signal to drive said electromagnet.

7. A lens-fitted photo film unit as defined in claim 6, further comprising a diode, which is connected to said electromagnet in parallel therewith and in reverse thereto, and across which a current flows when a back electromotive force occurs across said electromagnet.

8. A lens-fitted photo film unit as defined in claim 7, further comprising a metal armature, disposed on said changeover plate, and attracted by said electromagnet.

9. A lens-fitted photo film unit as defined in claim 8, wherein said changeover plate is rotatable between said inserted position and said retracted position, and said retainer member is a rotatable retainer lever;

further comprising a second spring for biasing said retainer lever to set said changeover plate in said inserted position.

10. A lens-fitted photo film unit as defined in claim 9, wherein said changeover plate is disposed in front of said exposure opening.

11. A lens-fitted photo film unit as defined in claim 9, wherein said changeover plate is disposed behind said exposure opening.

12. A lens-fitted photo film unit as defined in claim 9, wherein said retainer lever is disposed under said shutter button and over said changeover plate; and said changeover plate and said retainer lever are rotatable about respective axes parallel with an optical axis defined to pass said exposure opening.

* * * * *